(12) United States Patent
Galizio

(10) Patent No.: US 10,494,504 B2
(45) Date of Patent: Dec. 3, 2019

(54) SHEA BUTTER-CONTAINING RUBBER COMPOSITIONS AND RELATED METHODS

(71) Applicant: Bridgestone Americas Tire Operations, LLC, Nashville, TN (US)

(72) Inventor: Benjamin C. Galizio, Kent, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 101 days.

(21) Appl. No.: 15/579,504

(22) PCT Filed: Apr. 28, 2016

(86) PCT No.: PCT/US2016/029666
§ 371 (c)(1),
(2) Date: Dec. 4, 2017

(87) PCT Pub. No.: WO2016/195858
PCT Pub. Date: Dec. 8, 2016

(65) Prior Publication Data
US 2018/0163017 A1    Jun. 14, 2018

Related U.S. Application Data

(60) Provisional application No. 62/170,946, filed on Jun. 4, 2015.

(51) Int. Cl.
| C08K 5/11 | (2006.01) |
| B60C 1/00 | (2006.01) |
| B60C 11/00 | (2006.01) |
| C08K 5/09 | (2006.01) |
| C08L 9/00 | (2006.01) |
| C08L 9/06 | (2006.01) |
| C08L 7/00 | (2006.01) |
| C08L 91/00 | (2006.01) |

(52) U.S. Cl.
CPC ............... *C08K 5/11* (2013.01); *B60C 1/00* (2013.01); *B60C 1/0016* (2013.01); *B60C 11/00* (2013.01); *B60C 11/0008* (2013.01); *C08K 5/09* (2013.01); *C08L 7/00* (2013.01); *C08L 9/00* (2013.01); *C08L 9/06* (2013.01); *B60C 1/0008* (2013.01); *B60C 1/0025* (2013.01); *C08L 91/00* (2013.01)

(58) Field of Classification Search
CPC .............................. C08K 5/11; B60C 1/0016
See application file for complete search history.

(56) References Cited

U.S. PATENT DOCUMENTS

| 2,495,099 | A | 1/1950 | Harrison et al. |
| 7,411,018 | B2 | 8/2008 | Appel et al. |
| 2006/0111490 | A1 | 5/2006 | Fonolla Moreno |
| 2009/0118397 | A1 | 5/2009 | Bloom |
| 2010/0104884 | A1 | 4/2010 | Bloom et al. |
| 2010/0172856 | A1 | 7/2010 | Dias et al. |
| 2011/0233479 | A1 | 9/2011 | Korzhenko et al. |
| 2011/0245374 | A1 | 10/2011 | Bames et al. |
| 2014/0100310 | A1 | 4/2014 | Cai et al. |
| 2014/0135437 | A1 | 5/2014 | Sandstrom et al. |

FOREIGN PATENT DOCUMENTS

| CN | 104312155 | | 1/2015 |
| EP | 1524300 | A1 | 4/2005 |
| EP | 1696002 | | 8/2006 |
| WO | 2012012133 | | 1/2012 |
| WO | 2014074872 | | 5/2014 |

OTHER PUBLICATIONS

Seewald; Vertellus: Building on Strengths, Chemical Week169.5; Feb. 7, 2007: No. 37.

Ismail, et al.; The comparison effects of palm oil fatty acid and stearic acid in various natural rubber compounds; Journal of Elastomers and Plastics; Apr. 2001, v. 33, No. 2, pp. 100-1123.

International Search Report and Written Opinion issued in corresponding International PCT Application No. PCT/US2016/029666; dated Jul. 29, 2016.

*Primary Examiner* — Vickey Nerangis
(74) *Attorney, Agent, or Firm* — Meredith E. Hooker; J. Gregory Chrisman

(57) ABSTRACT

Disclosed herein are rubber compositions comprising shea butter and a rubber, and tires (and tire components) made from the rubber compositions. The rubber component comprises at least one conjugated diene monomer-containing polymer or copolymer. Also disclosed are methods of improving the wear resistance of the rubber composition by utilizing shea butter.

13 Claims, No Drawings

ововrubber compositions. The disclosure also
SHEA BUTTER-CONTAINING RUBBER COMPOSITIONS AND RELATED METHODS

TECHNICAL FIELD

The present disclosure relates to rubber compositions comprising shea butter and a rubber. The disclosure also relates to methods of improving the wear resistance of a rubber composition by utilizing shea butter in the rubber composition.

BACKGROUND

In certain applications, it is desirable for rubber compounds, such as the tread portion of a tire, to exhibit improved abrasion or wear resistance to extend the life of the tire. It is also advantageous to improve wear resistance without significantly impacting other useful properties of the rubber compounds, such as cure, functionality of the matrix polymer, and the elastic modulus of the compound.

It is also generally advantageous to reduce the amount of process oil utilized in a rubber formulation without negatively impacting useful properties of the rubber compound, such as processability.

SUMMARY

Provided herein are rubber compositions including at least one rubber component and the use of shea butter, for example as a plasticizer, either partially or fully replacing traditional petroleum-derived oil, for improving the wear resistance of the rubber compositions with the addition of shea butter. The rubber compositions can be used for a tire and can include one rubber component and about 1 to about 50 phr of shea butter, or about 5 to about 30 phr of shea butter.

In one embodiment, the rubber component of the rubber compositions can include at least one conjugated diene monomer-containing polymer or copolymer. For example, the at least one diene monomer-containing polymer or copolymer being at least one of styrene-butadiene copolymer, polybutadiene, polyisoprene, and styrene-isoprene copolymer.

In another embodiment, the shea butter used in the rubber compositions can have a fatty acid profile that includes at least 30 weight percent of stearic acid based on the weight of the fatty acids present in the shea butter. In one example, the fatty acid profile of the shea butter can include greater than 40 weight percent of stearic acid based on the weight of the fatty acids present in the shea butter.

The rubber compositions can have an improved Lambourn wear index, for example, of more than 105 as compared to an un-modified rubber composition having the same composition as the rubber composition but having an equivalent amount of a petroleum-derived oil in place of the shea butter and having a relative standard Lambourn index value of 100. In another example, the rubber compositions can have a Lambourn wear index of more than 110.

The rubber compositions can further include other components, for example, at least one reinforcing filler in an amount of about 5 to about 200 phr or a cure package.

In another embodiment, the rubber compositions can be a component of a tire. For example, the tire component can be a tread member, an inner lining, sidewalls, body plies, or a belt package. In another example, the tread member of a tire can include a portion of the rubber composition, for instance, in an amount of at least 50 weight percent based on the weight of the tread member. As used as a component of a tire, disclosed herein are also tires that include the rubber compositions that include shea butter as a component.

Disclosed herein are methods for improving the wear resistance of rubber compositions by incorporating shea butter in the rubber compositions, for example, including shea butter at about 1 to about 50 phr, or about 5 to about 30 phr in the rubber compositions.

In one embodiment, the methods can include rubber compositions having at least one conjugated diene monomer-containing polymer or copolymer. For example, the at least one diene monomer-containing polymer or copolymer being at least one of styrene-butadiene copolymer, polybutadiene, polyisoprene, and styrene-isoprene copolymer.

In another embodiment, the methods can include the use of shea butter having a fatty acid profile that includes at least 30 weight percent of stearic acid based on the weight of the fatty acids present in the shea butter. In one example, the fatty acid profile of the shea butter can include greater than 40 weight percent of stearic acid based on the weight of the fatty acids present in the shea butter.

The methods can include adding other components to the rubber compositions, for example, reinforcing filler in an amount of about 5 to about 200 phr, a cure package or, a combination thereof.

In another embodiment, the methods can improve the wear resistance of rubber compositions such that the rubber compositions have an improved Lambourn wear index, for example, of more than 105 as compared to an un-modified rubber composition having the same composition as the rubber composition but having an equivalent amount of petroleum-derived oil in place of the shea butter and having a relative standard Lambourn index value of 100. In another example, the rubber compositions can have a Lambourn wear index of more than 110.

In another embodiment, the methods can include using the rubber compositions as a component of a tire. For example, the tire component can be a tread member, an inner lining, sidewalls, body plies, or a belt package. In another example, the tread member of a tire can include a portion of the rubber composition, for instance, in an amount of at least 50 weight percent based on the weight of the tread member.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more than or less than 25. In an example, such a range defines independently at least 5, and separately and independently, not more than 25.

As used herein, the term "phr" means the parts by weight of rubber. If the rubber composition comprises more than one rubber, "phr" means the parts by weight per hundred parts of the sum of all rubbers.

As used herein, the term "polybutadiene" is used to indicate a polymer that is manufactured from cis-1,3-butadiene monomers. The term polybutadiene is also used interchangeably with the phrase "polybutadiene rubber" and the abbreviation "BR."

As used herein, the term "polyisoprene" means synthetic polyisoprene. In other words, the term is used to indicate a polymer that is manufactured from isoprene monomers, and should not be construed as including naturally occurring natural rubber (e.g., Hevea natural rubber, guayule-sourced natural rubber or dandelion-sourced natural rubber). The term polyisoprene is also used interchangeably with the phrase "polyisoprene rubber" and the abbreviation "IR."

As used herein, the term "styrene-butadiene rubber" or "SBR" means a copolymer manufactured from styrene and cis-I,3-butadiene monomers.

As used herein, the term "styrene-isoprene rubber" or "SIR" means a copolymer manufactured from styrene and isoprene monomers.

As used herein, the term "natural rubber" or "NR" means naturally occurring rubber such as can be harvested from sources such as Hevea rubber trees, and non-Hevea source (e.g., guayule shrubs, and dandelions (e.g., TKS)). In other words, the term "natural rubber" should not be construed as including polyisoprene.

For the purpose of this disclosure, any reference to a percent amount of a component in the rubber composition means a percent by weight, unless otherwise specified. Similarly, any reference to ratios of component amounts in the rubber composition means the ratios by weight, unless otherwise specified. Unless stated to the contrary, discussions herein relating to the components and amounts of the rubber compositions of the present disclosure should be understood to apply equally to the other embodiments, e.g., the related methods and the tires (and tire treads) containing the rubber compositions disclosed herein.

As discussed above, according to certain embodiments disclosed herein, the rubber compositions comprise about 1 to about 50 phr of shea butter. In other embodiments, the rubber compositions comprise about 5 to about 30 phr of shea butter, or about or less than 5, 8, 10, 12, 15, 20 or 25 phr of shea butter.

Shea butter is a complex fat extracted from the nut of the African Shea Tree, Vitellaria *paradoxa*. Shea butter is mainly used in the cosmetics industry for skin and hair related products. It is also used by soap makers in small amounts because it has many nonsaponifiable components. In addition to its many nonsaponifiable components, shea butter extract can have a fatty acid profile that includes the following fatty acids: oleic acid, stearic acid, linoleic acid, palmitic acid, linolenic acid and arachidic acid. Shea butter is unique in the "bio-oil" landscape due to its high stearic acid concentration, which is commonly used in rubber compounding.

Shea butter is primarily comprised of triglycerides, which are esters derived from glycerol and fatty acids. The composition of shea butter can be defined, in part, in terms of the relative amounts of different fatty acids contained within shea butter. Generally, the fatty acid content or profile is discussed, even if the actual fatty acids are present in an ester form such as a triglyceride, diglyceride, or monoglyceride. The most prevalent fatty acids in shea butter are: palmitic acid (a sixteen carbon unsaturated fatty acid, abbreviated as C16:0), stearic acid (an eighteen carbon unsaturated fatty acid, abbreviated as C18:0), oleic acid (an 18 carbon mono unsaturated fatty acid, abbreviated as C18:1), linoleic acid (an 18 carbon polyunsaturated fatty acid, abbreviated as C18:2), and arachidic acid (a 20 carbon saturated fatty acid, abbreviated as C20:0).

In the embodiments disclosed herein, the shea butter utilized in the rubber compositions can include a fatty acid profile that includes a majority of C18 polyunsaturated fatty acids, and primarily stearic acid and oleic acid. The fatty acid profile can include at least 15, 20, 25, 30, 35 or 40 weight percent of steric acid based on the weight of the total fatty acids present in the shea butter. In certain embodiments, the shea butter utilized in the rubber compositions includes a majority of C18 or higher polyunsaturated fatty acids, including at least about 55% by weight, at least about 60% by weight, or at least 70% by weight C18 or higher polyunsaturated fatty acids. In certain embodiments, the shea butter utilized in the rubber compositions includes no more than 55% by weight oleic acid, no more than about 50% or no more than 45%. In certain embodiments, the shea butter utilized in the rubber compositions includes no more than 20% by weight of linoleic acid, no more than 15% by weight, no more than 10% by weight or no more than 8% by weight.

In one example, the shea butter utilized in the rubber compositions can have a fatty acid profile of about 4% by weight palmitic acid, about 42% by weight stearic acid, about 46% by weight oleic acid, about 7% by weight linoleic acid, and about 1% by weight arachidic acid. Table 1 shows the fatty acid profile of shea butter in comparison with soy oil.

TABLE 1

Fatty Acid Profile of Shea Butter and Soy Oil

| | | Soy Oil (wt %) | Shea Butter (wt %) |
|---|---|---|---|
| C16:0 | Palmitic Acid | 10.6 | 4.0 |
| C18:0 | Stearic Acid | 4.0 | 41.5 |
| C18:1 | Oleic Acid | 23.2 | 46.4 |
| C18:2 | Linoleic Acid | 53.7 | 6.6 |
| C20:0 | Arachidic Acid | 0.3 | 1.3 |

The use of shea butter in the rubber compositions can result in significant improvement in rubber compound wear resistance, e.g., Lambourn wear resistance, compared to the use of processing oil, for example, petroleum-derived oils, e.g., traditional black oil. In one or more embodiments, the rubber compositions including shea butter as described herein can exhibit an improved Lambourn index (i.e. wear resistance) of at least 105, at least 110, at least 115, or at least 120. The Lambourn index of the inventive rubber compositions are determined by comparing them to a rubber sample having an identical composition except not being modified by shea butter and containing an equivalent amount by weight of a petroleum-derived oil (e.g., black oil) in place of the absent shea butter, where the unmodified composition has a comparative Lambourn index of 100. The wear resistance of rubber compositions as a tire wear performance indicator is measured using a Lambourn Abrasion Tester. A circular test specimen, for instance a rubber wheel, is placed on an axle and run at various slip angles and speeds against a driven abrasive surface, e.g., 120 grit sand paper. Talc powder is used as a lubricant. The test specimen is weighed before testing an after testing to determine the amount of material loss and a wear index is calculated using the average rate of material loss (typically using 3-5 data points). Thus, a wear resistance index greater than 100 indicates that the experimental compound is better (abrades at a lower rate) than the control compound having a standardized index of 100.

In one or more embodiments, the rubber compositions can have improved wear resistance without a loss exhibiting a significant decrease in other properties, e.g., viscoelastic and mechanical properties. Properties can include, e.g., viscoelastic E' (indexed), tan δ, tensile stress, $T_b \times E_b$ ($T_b$ is stress at break and $E_b$ is elongation at break). The rubber compositions described herein can have viscoelastic and/or mechanical properties of within ±5%, 7% or 10% as compared to a rubber sample having an identical composition except not being modified by shea butter and containing an equivalent amount by weight of a petroleum-derived oil (e.g., black oil) in place of the absent shea butter.

As discussed above, according to the embodiments disclosed herein, the rubber composition comprises at least one rubber. These rubber compositions can be understood as comprising 100 parts of rubber (100 phr), which includes at least one rubber. The at least one rubber can be selected from natural rubber, synthetic rubber, or combinations thereof. Suitable rubbers for use in the rubber composition are well known to those skilled in the art and include, but are not limited to the following: synthetic polyisoprene rubber, natural rubber, styrene-butadiene rubber (SBR), styrene-isoprene rubber, butadiene-isoprene-rubber, styrene-isoprene-butadiene rubber, polybutadiene, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber, and combinations thereof. Examples of fluorinated rubber include perfluoroelastomer rubber, fluoroelastomer, fluorosilicone, and tetrafluoroethylene-propylene rubber.

In certain embodiments disclosed herein, at least a majority (by weight) of the at least one rubber comprises at least one of: natural rubber, polyisoprene rubber, polybutadiene rubber, and styrene-butadiene rubber; in such embodiments, one or more than one type of any of the foregoing rubbers can be utilized. In certain embodiments, at least 60% by weight (at least 60 phr), at least 70% by weight (at least 70 phr), at least 80% by weight (at least 80 phr), at least 90% by weight (at least 90 phr), at least 95% by weight (at least 95 phr), or even 100% by weight (100 phr) of the rubber comprises at least one of: natural rubber, synthetic polyisoprene rubber, polybutadiene rubber, and styrene-butadiene rubber.

In certain embodiments disclosed herein, a minority (by weight) of the at least one rubber comprises at least one of: styrene-isoprene rubber, butadiene-isoprene-rubber, styrene-isoprene-butadiene rubber, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber. In certain embodiments, up to 40% by weight (up to 40 phr), up to 30% by weight (up to 30 phr), up to 20% by weight (up to 20 phr), up to 10% by weight (up to 10 phr), up to 5% by weight (up to 5 phr) of the rubber comprises at least one of: styrene-isoprene rubber, butadiene-isoprene-rubber, styrene-isoprene-butadiene rubber, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber. In other embodiments, 0% by weight (0 phr) of the rubber comprises styrene-isoprene rubber, butadiene-isoprene-rubber, styrene-isoprene-butadiene rubber, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber; in certain such embodiments, 100 phr of the rubber comprises at least one of: natural rubber, synthetic polyisoprene rubber, polybutadiene rubber, and styrene-butadiene rubber. In yet other embodiments, up to 100% by weight (100 phr), including up to 90% by weight (90 phr), up to 80% by weight (80 phr), up to 70% by weight (70 phr) and up to 60% by weight (60 phr) of the rubber comprises at least one of: styrene-isoprene rubber, butadiene-isoprene-rubber, styrene-isoprene-butadiene rubber, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber.

In certain embodiments disclosed herein, the at least one rubber comprises a polymer, a copolymer, or a combination thereof (i.e., more than one polymer, more than one copolymer, one polymer and one copolymer, more than one polymer and one copolymer, more than one copolymer and one polymer, or more than one copolymer and more than one polymer) when more than one rubber is utilized. In certain embodiments of the first-third embodiments disclosed herein, the at least one rubber includes at least one diene monomer-containing polymer or copolymer. Examples of suitable diene monomers according to certain embodiments of the first-third embodiments disclosed herein include, but are not limited to, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more dienes may be utilized in certain embodiments. Non-limiting examples of suitable polymers that are diene monomer-containing polymers or copolymers include, but are not limited to, styrene-butadiene rubber, polybutadiene, polyisoprene, styrene-isoprene rubber, styrene-butadiene-isoprene rubber, and natural rubber. In certain embodiments of the first-third embodiments disclosed herein, the at least one rubber is at least one of: styrene-butadiene rubber, polybutadiene, synthetic polyisoprene rubber, and natural rubber.

As discussed above, according to certain embodiments, the at least one rubber comprises polybutadiene. In certain embodiments, the polybutadiene comprises a high cis polybutadiene. In certain embodiments, the high cis polybutadiene has a cis 1,4-bond content of 85% of greater, 90% or greater, 92% or greater, or 95% or greater. In certain embodiments, the polybutadiene has a cis 1,4-bond content of 85-99%, 90-99%, 90-98%, 90-97%, 92-99%, 92-98%, 92-97%, 95-99%, 95-98%, or 95-97%. In certain embodiments, the polybutadiene comprises a low cis polybutadiene. In certain embodiments, the low polybutadiene has a cis 1,4-bond content of less than 50%, less than 45%, or less than 40%.

Generally, various polymerization methods are known for producing polybutadiene having a cis 1,4-bond content of 85% or greater, 90% or greater, 92% or greater, or 95% or greater and it should be understood that the particular method by which the polybutadiene is produced is not limited as long as the resulting polybutadiene has the specified cis 1,4-bond content. The percentages are based upon the number of diene mer units adopting the cis-1,4 linkage versus the total number of diene mer units. Polymerization of high-cis 1,4-polybutadiene is described in U.S. Pat. Nos. 3,297,667, 3,541,063, 3,794,604, 4,461,883, 4,444,903, 4,525,594, 4,699,960, 5,017,539, 5,428,119, 5,064,910, and 5,844,050, 7,094,849, all of which are hereby incorporated by reference. Exemplary polymerization methods include, but are not limited to, those employing Ziegler-Natta catalysts based on transition metals (e.g., lanthanides such as neodymium), nickel catalysts and titanium-based catalysts as well as solution, emulsion and bulk polymerization processes. Generally, the cis 1,4-, vinyl 1,2-, and trans 1,4-bond linkage contents in a given polymer such as polybutadiene can be determined by standard and well-established analytical methods such as infrared spectroscopy.

As discussed above, in certain embodiments, the at least one rubber comprises polyisoprene. In certain embodiments, the polyisoprene comprises high cis polyisoprene. In certain embodiments, the high cis polyisoprene has a cis 1,4-bond content of 90% of greater. In certain embodiments, the polyisoprene has a cis 1,4-bond content of 90% or greater, 92% or greater, or 95% or greater. In certain embodiments, the polyisoprene has a cis 1,4-bond content of 90-99%, 90-98%, 90-97%, 92-99%, 92-98%, 92-97%, 95-99%, 95-98%, or 95-97%.

Various polymerization methods are known for producing polyisoprene, including polyisoprene having a cis 1,4-bond content of 90% or greater, and it should be understood that the particular method by which the polyisoprene is produced is not limited as long as the resulting polymer has the desired cis 1,4-bond content. As previously discussed with respect to polybutadiene, the percentages are based upon the number of diene mer units adopting the cis-1,4 linkage versus the total number of diene units. Polymerization of high-cis polyisoprene is described in U.S. Pat. Nos. 8,664,343; 8,188,201; 7,008,899; 6,897,270; and 6,699,813, all of which are hereby incorporated by reference. Exemplary polymerization methods include, but are not limited to, those employing Ziegler-Natta catalyst systems and those employing anionic polymerization with organometallic catalysts such as alkyl lithium in hydrocarbon solvents. As previously discussed with respect to polybutadiene, the cis-1,4-, cis-1, 2-, and trans-1,4-linkage contents in a given polymer such as polyisoprene can be determined by standard and well-established analytical methods such as infrared spectroscopy.

As discussed above, in certain embodiments, the at least one rubber comprises the copolymer styrene-butadiene rubber (SBR). SBR is a copolymer of styrene and butadiene monomers. In certain embodiments disclosed herein, the SBR used in the rubber composition comprises about 10 to about 50% styrene monomer and about 50 to about 90% butadiene monomer by weight. In certain embodiments disclosed herein, the SBR used in the rubber composition comprises 10 to 50% styrene monomer and 50 to 90% butadiene monomer by weight. Generally, SBR is produced by solution or emulsion polymerization methods; however, it should be understood that the particular method by which the SBR is produced is not limited. The styrene and butadiene monomer content in a given SBR copolymer can be determined by standard and well-established analytical methods such as infrared spectroscopy.

Numerous commercial sources of the foregoing rubbers are well-known. As non-limiting examples, Firestone Polymers offers various grades of its Diene™ polybutadiene which have varying cis 1,4-bond contents (e.g., 40% and 96%) as well as various grades of its Duradene™ solution polymerized styrene-butadiene copolymer. Other commercial sources of the rubbers are well known, including sources for emulsion polymerized styrene-butadiene copolymer, functionalized versions of styrene-butadiene copolymer, neoprene, polybutadiene, synthetic polyisoprene rubber, and natural rubber.

In certain embodiments disclosed herein, the at least one rubber of the rubber composition comprises a functionalized polymer. In certain such embodiments, the rubber composition comprises about 5 to about 100 phr of at least one functionalized polymer, about 10 to about 90 phr, about 10 to about 70 phr, about 10 to about 50 phr. In certain embodiments disclosed herein, the functionalized polymer comprises a polymer with a silica-reactive functional group, a nitrogen-containing functional group, an oxygen-containing functional group, a sulfur-containing functional group, or a combination of the foregoing. Non-limiting examples of silica-reactive functional groups that are known to be utilized in functionalizing conjugated diene polymers and are suitable for use in the rubber compositions of certain embodiments disclosed herein include nitrogen-containing functional groups, silicon-containing functional groups, oxygen or sulfur-containing functional groups, and metal-containing functional groups. As used herein, the term functionalized polymer should be understood to include polymers (including conjugated diene monomer-containing polymer or copolymer rubbers) with a functional group at one or both terminus (e.g., from use of a functionalized initiator, a functionalized terminator, or both), a functional group in the main chain of the polymer, and combinations thereof. For example, a silica-reactive functionalized polymer may have the functional group at one or both terminus, in the main chain thereof, or both in the main chain and at one or both terminus.

Non-limiting examples of nitrogen-containing functional groups that are known to be utilized in functionalizing rubbers include, but are not limited to, any of a substituted or unsubstituted amino group, an amide residue, an isocyanate group, an imidazolyl group, an indolyl group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments disclosed herein, the rubber composition comprises a functionalized conjugated diene monomer-containing polymer or copolymer rubber having at least one functional group selected from the foregoing list.

Non-limiting examples of silicon-containing functional groups that are known to be utilized in functionalizing rubbers include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups for use in functionalizing rubbers also include those disclosed in U.S. Pat. No. 6,369,167, the entire disclosure of which is hereby incorporated by reference. In certain embodiments disclosed herein, the rubber composition comprises a functionalized rubber having at least one functional group selected from the foregoing list.

Non-limiting examples of oxygen or sulfur-containing functional groups that are known to be utilized in functionalizing rubbers include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group and a thioketone group. In certain embodiments, the foregoing alkoxy group may be an alcohol-derived alkoxy group derived from a benzophenone. In certain embodiments disclosed herein, the rubber composition comprises a functionalized diene monomer-containing polymer or copolymer rubber having at least one functional group selected from the foregoing list.

Generally, rubbers, including diene monomer-containing polymer or copolymer rubbers, may be prepared and recovered according to various suitable methods such as batch, semi-continuous, or continuous operations, as are well known to those having skill in the art. The polymerization can also be carried out in a number of different polymerization reactor systems, including but not limited to bulk polymerization, vapor phase polymerization, solution polymerization, suspension polymerization, coordination polymerization, and emulsion polymerization. The polymerization may be carried out using a free radical mechanism, an anionic mechanism, a cationic mechanism, or a coordination mechanism. All of the above polymerization methods are well known to persons skilled in the art. However, for exemplary purposes, a short description of polymerization via an anionic mechanism is given.

When rubbers, such as diene monomer-containing polymer or copolymer rubbers, are produced through anionic polymerization, an organic alkaline metal compound, preferably a lithium-containing compound, is typically used as a polymerization initiator. Examples of lithium-containing compounds used as polymerization initiators include, but are not limited to, hydrocarbyl lithium compounds, lithium amide compounds, and similar lithium compounds. The amount of the lithium compound used as the polymerization initiator is preferably within a range of 0.2 to 20 millimoles per 100 g of the monomer.

Non-limiting examples of hydrocarbyllithium compounds include ethyl lithium, n-propyllithium, isopropyl lithium, n-butyllithium, sec-butyl lithium, tert-octyllithium, n-decyl lithium, phenyl lithium, 2-naphthyl lithium, 2-butyl-phenyl lithium, 4-phenyl-butyl lithium, cyclohexyl lithium, cyclopentyl lithium, a reaction product of diisopropenylbenzene and butyl lithium, and mixtures thereof. Among these, alkyl lithium compounds such as ethyl lithium, n-propyl lithium, isopropyl lithium, n-butyl lithium, sec-butyl lithium, tert-octyl lithium, n-decyl lithium and so on are preferable, and n-butyllithium is particularly preferable.

Methods for producing rubbers, such as diene-monomer-containing polymer or copolymer rubbers, through anionic polymerization using an organic alkaline metal compound as the polymerization initiator are not particularly limited. For example, a diene monomer-containing polymer or copolymer rubber can be produced by polymerizing a conjugated diene monomer alone or a mixture of a diene monomer and aromatic vinyl compound in a hydrocarbon solvent inactive to the polymerization reaction. Non-limiting examples of the hydrocarbon solvent inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and mixtures thereof.

The anionic polymerization may be carried out in the presence of a randomizer. The randomizer can control the microstructure of the diene compound, and has an action that the 1,2-bond content in butadiene unit of the polymer using, for example, butadiene as a monomer is controlled, and butadiene unit and styrene unit in the copolymer using butadiene and styrene as a monomer are randomized, or the like. Non-limiting examples of the randomizer include dimethoxybenzene, tetrahydrofuran, dimethoxyethane, diethylene glycol dibutyl ether, diethylene glycol dimethyl ether, bis tetrahydrofuryl propane, triethylamine, pyridine, N-methylmorpholine, N,N,N',N-tetramethyl ethylenediamine, 1,2-dipiperidinoethane, potassium+amylate, potassium-t-butoxide, sodium-t-amylate and so on. The amount of the randomizer used is preferably within a range of 0.01 to 100 molar equivalents per 1 mol of the organic alkaline metal compound as a polymerization initiator.

The anionic polymerization may be carried out through any of solution polymerization, vapor phase polymerization and bulk polymerization. In the solution polymerization, the concentration of the monomer in the solution is preferably within a range of 5 to 50% by mass, more preferably 10 to 30% by mass. When the conjugated diene monomer and a vinyl aromatic monomer are used together, the content of the vinyl aromatic monomer in the mixture is preferably within a range of 3 to 50% by mass, more preferably 4 to 45% by mass. Also, the polymerization system is not particularly limited and may be a batch system or a continuous system.

The polymerization temperature in the anionic polymerization is preferably within a range of 0 to 150° C., more preferably 20 to 130° C. The polymerization may be carried out under a generating pressure or, preferably, at a pressure sufficient to keep the reaction monomers substantially in a liquid phase. When the polymerization reaction is carried out under a pressure higher than the generating pressure, the reaction system is preferably pressurized with an inert gas. Preferably, any reaction-obstructing substances, such as water, oxygen, carbon dioxide, protonic compounds, and the like are removed before beginning the polymerization reaction.

Typically, in the rubber compositions according to the embodiments disclosed herein, the overall composition contains 100 phr (in total) of at least one rubber. In other words, the total amount of all rubbers is considered to be 100 parts (by weight) and denoted 100 phr. Other components are added based upon 100 parts (in total) of rubber(s). As a non-limiting example, 60 parts of styrene-butadiene copolymer could be utilized along with 40 parts of polybutadiene polymer and 60 parts of silica; these amounts would be described herein as 60 phr of styrene-butadiene copolymer, 40 phr of polybutadiene polymer and 60 phr of silica.

As discussed above, according to the embodiments disclosed herein, the rubber composition comprises about 5 to about 200 phr of at least one reinforcing filler. One or more than one reinforcing filler may be utilized in the rubber compositions according to the embodiments disclosed herein. In certain embodiments disclosed herein, the total amount of the reinforcing filler is 5 to 200 phr, including about 10 to about 200 phr, about 10 to about 175 phr, about 25 to about 150 phr, about 35 to about 150 phr, about 25 to about 125 phr, about 25 to about 100 phr, about 25 to about 80 phr, about 35 to about 125 phr, about 35 to about 100 phr, about 35 to about 80 phr of at least one reinforcing filler. In certain embodiments, the useful upper range for the amount of reinforcing filler can be considered to be somewhat limited by the high viscosity imparted by fillers of this type.

As used herein, the term "reinforcing" with respect to "reinforcing carbon black filler," "reinforcing silica filler," and "reinforcing fillers" generally should be understood to encompass both fillers that are traditionally described as reinforcing as well as fillers that may traditionally be described as semi-reinforcing. Traditionally, the term "reinforcing filler" is used to refer to a particulate material that has a nitrogen absorption specific surface area (N2SA) of more than about 100 m2/g, and in certain instances more than 100 $m^2/g$, more than about 125 $m^2/g$, or even more than about 150 $m^2/g$. Alternatively, the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to filler that is intermediary in either particle size, surface area (N2SA), or both, to a non-reinforcing filler and a reinforcing filler. In certain embodiments disclosed herein, the term "reinforcing filler" is used to refer to a particulate material that has a nitrogen absorption specific surface area (N2SA) of about 20 $m^2/g$ or greater, more than about 50 $m^2/g$, more than about 100 $m^2/g$, or more than about 125 $m^2/g$. In certain embodiments disclosed herein, the term "reinforcing filler" is used to refer to a particulate material that has a particle size of about 10 nm up to about 1000 nm, or about 10 nm up to about 50 nm.

In certain embodiments disclosed herein, the at least one reinforcing filler comprises at least one of: carbon black or silica. In other words, in such embodiments, the at least one reinforcing filler comprises at least one carbon black, at least one silica, or at least one carbon black and at least one silica. In certain embodiments disclosed herein, the at least one reinforcing filler comprises at least one of: carbon black or silica, and further comprises at least one additional reinforcing filler. In other words, in such embodiments, the at least one reinforcing filler comprises at least one carbon black and at least one additional reinforcing filler (other than silica), at least one silica and at least one additional reinforcing filler (other than carbon black), or at least one silica and at least one carbon black and at least one additional reinforcing filler (other than the carbon black or silica). As discussed in more detail below, in certain embodiments disclosed herein, the at least one reinforcing filler comprises at least one reinforcing filler other than carbon black or silica.

As discussed above, in certain embodiments disclosed herein the rubber composition comprises at least one reinforcing filler which comprises silica. Suitable reinforcing silica fillers for use in the rubber composition of certain embodiments disclosed herein are well known. Non-limiting examples of reinforcing silica fillers suitable for use in the rubber compositions of certain embodiments disclosed herein include, but are not limited to, precipitated amorphous silica, wet silica (hydrated silicic acid), dry silica (anhydrous silicic acid), fumed silica, calcium silicate and the like. Other suitable reinforcing silica fillers for use in rubber compositions of certain embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_{43}SiO_4$, $5H_2O$ etc.), aluminum calcium silicate ($Al_2O_3.CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments disclosed herein, the rubber composition comprises a reinforcing silica filler having a surface area (as measured by the BET method) of about 32 $m^2/g$ to about 400 $m^2/g$), with the range of about 100 $m^2/g$ to about 300 $m^2/g$ being preferred, and the range of about 150 $m^2/g$ to about 220 $m^2/g$ being included. In certain embodiments disclosed herein, the rubber composition comprises reinforcing silica filler having a pH of about 5.5 to about 7 or slightly over 7, preferably about 5.5 to about 6.8. Some of the commercially available reinforcing silica fillers which can be used in the rubber compositions of certain embodiments disclosed herein include, but are not limited to, Hi-Sil®190, Hi-Sil®210, Hi-Sil®215, Hi-Sil®233, Hi-Sil®243, and the like, produced by PPG Industries (Pittsburgh, Pa.). As well, a number of useful commercial grades of different reinforcing silica fillers are also available from Degussa Corporation (e.g., VN2, VN3), Rhone Poulenc (e.g., Zeosil™ 1165MP), and J. M. Huber Corporation.

In certain embodiments disclosed herein, as discussed in more detail below, the reinforcing silica filler comprises a silica that has been pre-treated with a silica coupling agent; preferably the pre-treated silica comprises a silica that has been pre-treated with a silane-containing silica coupling agent.

As discussed above, in certain embodiments disclosed herein the rubber composition comprises at least one reinforcing filler which comprises silica. As discussed in more detail below, most carbon blacks are commonly understood to be reinforcing fillers. In certain embodiments disclosed herein, the rubber composition comprises carbon black in an amount of from zero to about 50% by weight of the total reinforcing filler, including zero to 50%, about 5% to about 30%, 5% to 30%, from about 5% to about 20%, 5% to 20%, about 10% to about 30%, 10% to 30%, about 10% to about 20%, and 10% to 20% by weight of the total reinforcing filler. In certain embodiments disclosed herein, the carbon black comprises no more than about 30% by weight (including no more than 30% by weight) of the total reinforcing filler in the rubber composition. In certain embodiments disclosed herein, the rubber composition comprises about 5 to about 100 phr (including 5 to 100 phr) of one or more carbon blacks.

Generally, suitable carbon black for use as a reinforcing filler in the rubber composition of certain embodiments disclosed herein includes any of the commonly available, commercially-produced carbon blacks, including those having a surface area of at least about 20 $m^2/g$ and, more preferably, at least about 35 $m^2/g$ up to about 200 $m^2/g$ or higher. Surface area values used in this application are determined by ASTM D-1765 using the acetyltrimethylammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments disclosed herein, the rubber composition includes a mixture of two or more of the foregoing blacks. Typical suitable carbon blacks for use in certain embodiments disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

As discussed above, in certain embodiments disclosed herein, the rubber composition comprises at least one reinforcing filler comprising a reinforcing filler other than carbon black or silica. In those embodiments disclosed herein where the rubber composition comprises at least one reinforcing filler comprising silica, carbon black, or both, this reinforcing filler other than carbon black or silica may be referred to as an additional reinforcing filler. In certain embodiments disclosed herein, the rubber composition comprises at least one of: carbon black or silica, and at least one additional reinforcing filler. In other words, in certain embodiments disclosed herein, the rubber composition comprises at least reinforcing carbon black and at least one additional reinforcing filler; at least one reinforcing silica filler and at least one additional reinforcing filler; or at least one reinforcing carbon black, at least one reinforcing silica filler, and at least one additional reinforcing filler.

Suitable reinforcing fillers other than carbon black or silica for use in the rubber composition of certain embodiments of the first-third embodiments disclosed herein are well known. Non-limiting examples of suitable additional reinforcing fillers for use in the rubber compositions of certain embodiments of the first-third embodiments disclosed herein include, but are not limited to, alumina, aluminum hydroxide, clay (reinforcing grades), magnesium hydroxide, boron nitride, aluminum nitride, titanium dioxide, reinforcing zinc oxide, and combinations thereof.

As discussed above, in certain embodiments disclosed herein, the rubber compositions comprises at least one non-reinforcing filler. In certain embodiments disclosed herein, the rubber composition comprises at least one non-reinforcing filler in addition to the at least one reinforcing filler. In other embodiments disclosed herein, the rubber composition comprises at least one non-reinforcing filler without the need for any reinforcing filler, i.e., in such embodiments the at least one non-reinforcing filler is essential while a reinforcing filler is not.

In certain embodiments, the rubber composition further comprises at least one non-reinforcing filler. In certain embodiments, the term "non-reinforcing filler" is used to refer to a particulate material that has a nitrogen absorption specific surface area (N2SA) of less than about 20 $m^2/g$, and in certain embodiments less than about 10 $m^2/g$. The N2SA surface area of a particulate material can be determined according to various standard methods including ASTM D6556. In certain embodiments of the compositions and methods disclosed herein, the term "non-reinforcing filler" is used to refer to a particulate material that has a particle size of greater than about 1000 nm.

Suitable non-reinforcing fillers for use m the rubber composition of certain embodiments disclosed herein are well known. In certain embodiments disclosed herein, the rubber composition further comprises at least one of the following non-reinforcing fillers: clay, graphite, talc, mica, titanium dioxide, magnesium dioxide, aluminum oxide, titanium oxide, calcium oxide, aluminum hydroxide, starch, boron nitride, silicon nitride, aluminum nitride, etc.), silicon carbide, aluminum carbonate $(Al_2(CO_3)_2$, non-reinforcing grades of calcium carbonate $(CaCO_3)$, magnesium carbonate $(MgCO_3)$, calcium oxide, mica, calcium oxide, boron nitride, silicon nitride, aluminum nitride, calcium silicate (or silicon carbide $(Ca_2SiO_4$, etc.), or crystalline aluminosilicates. In certain embodiments disclosed herein, the rubber composition further comprises a non-reinforcing carbon black. Examples of suitable carbon blacks having a nitrogen surface area of no more than 20 m2/g include, but are not limited to, thermal blacks or the N9 series carbon blacks (also referred to as the N-900 series), such as those with the ASTM designation N-907, N-908, N-990, and N-991. Various carbon blacks meeting the foregoing are commercially available, including but not limited to Thermax® N990 carbon black from Cancarb Limited (Medicine Hat, Alberta, Canada).

In certain embodiments, the rubber composition further comprises at least one inorganic filler (other than silica). Such an inorganic filler can be described as a non-silica inorganic filler. In other words, certain embodiments disclosed herein, the rubber composition comprises at least one inorganic filler (other than silica) in addition to the at least one reinforcing filler. In other embodiments disclosed herein, the rubber composition comprises at least one inorganic filler (other than silica) without the need for any reinforcing filler, i.e., in such embodiments the at least one inorganic filler (other than silica) is essential while a reinforcing filler is not.

Inorganic fillers (other than silica) suitable for use in rubber compositions are well known. In certain embodiments disclosed herein, the rubber composition comprises at one of the following inorganic fillers: aluminum hydroxide, talc, clay, alumina $(Al_2O_3)$, aluminum hydrate $(Al_2O_3H_2O)$, aluminum hydroxide $(Al(OH)_3)$, aluminum carbonate $(Al_2(CO_3)_2)$, aluminum nitride, aluminum magnesium oxide $(MgOAl_2O_3)$, aluminum silicate $(Al_2SiO_5, Al_4:3SiO_4.5H_2O$ etc.), aluminum calcium silicate $(Al_2O_3.CaO_2SiO_2$, etc.), pyrofilite $(Al_2O_34SiO_2.H_2O)$, bentonite $(Al_2O_3.4SiO_2.2H_2O)$, boron nitride, mica, kaolin, glass balloon, glass beads, calcium oxide (CaO), calcium hydroxide $(Ca(OH)_2)$, calcium carbonate $(CaCO_3)$, calcium silicate $(Ca_2SiO_4$ etc.), magnesium carbonate, magnesium hydroxide $(Mg(OH)_2)$, magnesium oxide (MgO), magnesium carbonate $(MgCO_3)$, magnesium silicate $(Mg_2SiO_4, MgSiO_3$ etc.), magnesium calcium silicate $(CaMgSiO_4)$, titanium oxide, titanium dioxide, potassium titanate, barium sulfate, zirconium oxide $(ZrO_2)$, zirconium hydroxide $[Zr(OH)_2.nH_2O]$, zirconium carbonate $[Zr(CO_3)_2]$, crystalline aluminosilicates, reinforcing grades of zinc oxide (i.e., reinforcing zinc oxide), and combinations thereof. In certain embodiments disclosed herein, the rubber composition comprises at least one reinforcing filler (as discussed above) and at least one of the following inorganic fillers: aluminum hydroxide, talc, clay, alumina $(Al_2O_3)$, aluminum hydrate $(Al_2O_3H_2O)$, aluminum hydroxide $(Al(OH)_3)$, aluminum carbonate $(Al_2(CO_3)_2)$, aluminum nitride, aluminum magnesium oxide $(MgOAl_2O_3)$, aluminum silicate $(Al_2SiO_5, Al_43SiO_4.5H_2O$ etc.), aluminum calcium silicate $(Al_2O_3.CaO_2SiO_2$, etc.), pyrofilite $(Al_2O_34SiO_2.H_2O)$, bentonite $(Al_2O_3.4SiO_2.2H_2O)$, boron nitride, mica, kaolin, glass balloon, glass beads, calcium oxide (CaO), calcium hydroxide (Ca(OH)$_2$), calcium carbonate (CaCO$_3$), calcium silicate (Ca$_2$SiO$_4$ etc.), magnesium carbonate, magnesium hydroxide (Mg(OH)$_2$), magnesium oxide (MgO), magnesium carbonate (MgCO$_3$), magnesium silicate (Mg$_2$SiO$_4$, MgSiO$_3$ etc.), magnesium calcium silicate (CaMgSiO$_4$), titanium oxide, titanium dioxide, potassium titanate, barium sulfate, zirconium oxide (ZrO$_2$), zirconium hydroxide [Zr(OH)$_2$.nH$_2$O], zirconium carbonate [Zr(CO$_3$)$_2$], crystalline aluminosilicates, reinforcing grades of zinc oxide (i.e., reinforcing zinc oxide), and combinations thereof.

In certain embodiments disclosed herein, the rubber composition includes one or more silica coupling agents. Silica coupling agents are useful in preventing or reducing aggregation of the silica filler in those rubber compositions that include a silica filler. Aggregates of the silica filler particles are believed to increase the viscosity of the rubber composition, and, therefore, preventing this aggregation reduces the viscosity and improves the processability and blending of the rubber composition.

Generally, any conventional type of silica coupling agent can be used, such as those having a silane and a constituent component or moiety that can react with a polymer (rubber), particularly a vulcanizable polymer (rubber). The silica coupling agent acts as a connecting bridge between silica and the polymer. Suitable silica coupling agents include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments, the silica coupling agent can be added to the rubber composition in the form of a pre-treated silica; a pre-treated silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula R$^1$pSi(OR$^2$)$_{4-P}$ where each R$^2$ is independently a monovalent organic group, and p is an integer from 1 to 3, with the proviso that at least one R$^1$ is an alkyl group. Preferably p is 1. Generally, each R$^1$ independently comprises C1 to C20 aliphatic, C5 to C20 cycloaliphatic, or C6 to C20 aromatic; and each R$^2$ independently comprises C1 to C6 aliphatic. In certain exemplary embodiments, each R$^1$ independently comprises C6 to C15 aliphatic and in additional embodiments each R$^1$ independently comprises Cs to C14 aliphatic. Mercapto silanes have the general formula HS—R$^3$—Si(R$^4$)(R$^5$)$_2$ where R$^3$ is a divalent organic group, R$^4$ is a halogen atom or an alkoxy group, each R$^5$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula B—S—R$^6$—Si—X$_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; R$^6$ is C1 to C6 linear or branched alkylidene and each X is independently selected from the group consisting of C1 to C4 alkyl or C1 to C4 alkoxy.

Non-limiting examples of alkyl alkoxysilanes suitable for use in the rubber compositions of certain exemplary embodiments according to the embodiments disclosed herein include, but are not limited to, octyltriethoxysilane, octyltrimethoxysilane, trimethylethoxysilane, ethyltrimethoxysilane, cyclohexyltriethoxysilane, cyclohexyl-tributoxysilane, isobutyltriethoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in the rubber compositions of certain exemplary embodiments according to the embodiments disclosed herein include bis(trialkoxysilylorgano)disulfides and bis(trialkoxysilylorgano)tetrasulfides. Specific non-limiting examples of bis(trialkoxysilylorgano)disulfides suitable for use in the rubber compositions of certain exemplary embodiments according to the embodiments disclosed herein include, but are not limited to, 3,3'-bis(triethoxysilylpropyl)disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-3,3'-bis(ethyl-di-sec-butoxysilylpropyl)disulfide, 12,12'-bis(triisopropoxysilylpropyl)disulfide, bis(diphenylcyclohexoxysilylpropyl)disulfide, 3,3'-bis(propyldiethoxysilylpropyl)disulfide, 3,3'-bis(dimethoxyphenylsilyl-2-methylpropyl)disulfide, and mixtures thereof. Non-limiting examples of bis(trialkoxysilylorgano)tetrasulfide silica coupling agents suitable for use in the rubber compositions of certain exemplary embodiments according to the embodiments disclosed herein include, but are not limited to, bis(3-triethoxysilylpropyl)tetrasulfide, bis(2-triethoxysilylethyl)tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyltetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in the rubber compositions of certain exemplary embodiments of the first-third embodiments disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in the rubber compositions of certain exemplary embodiments according to the embodiments disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes for use herein in certain exemplary embodiments disclosed herein include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; methyldiethoxysilylmethylthioacetate;

triisopropoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl) benzoic acid; 6-triethoxysil yl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 1 0-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; propylthiopalmitate; 3-trimethoxysilyl-1-propylthiooctanoate; 3-triethoxysilyl-1-propyl-1-3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethyl-thioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1 propyl) methyltrithiophosphonate; bis-(3-triethoxysilyl-1-propyl) ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propylethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXT™ silane (3-octanoylthio-1-propyltriethoxysilane), commercially available from Momentive Performance Materials Inc. of Albany, N.Y.

Non-limiting examples of pre-treated silicas (i.e., silicas that have been pre-surface treated with a silane) suitable for use in the rubber compositions of certain exemplary embodiments according to the embodiments disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica. Coupsil 6508, Agilon 400™ silica from PPG Industries, Agilon 454® silica from PPG Industries, and 458® silica from PPG Industries. In those embodiments of the rubber compositions and methods disclosed herein where the silica comprises a pre-treated silica, the pre-treated silica is used in an amount as previously disclosed for the reinforcing silica filler (i.e., about 5 to about 200 phr, including 5 to 200 phr, about 10 to about 200 phr, about 10 to about 175 phr, about 25 to about 150 phr, about 35 to about 150 phr, about 25 to about 125 phr, about 25 to about 100 phr, about 25 to about 80 phr, about 35 to about 125 phr, about 35 to about 100 phr, about 35 to about 80 phr.

When a silica coupling agent is utilized, the amount of silica coupling agent used in the rubber compositions according to the embodiments disclosed herein may vary. In certain embodiments disclosed herein, the rubber compositions do not contain any silica coupling agent. In other embodiments disclosed herein, the silica coupling agent is present in an amount sufficient to provide a ratio of the total amount of silica coupling agent to reinforcing silica filler of about 1:100 to about 1:5 (i.e., about 0.01 to about 20 parts by weight per 100 parts of silica), about 1:100 to about 1:10, about 1:100 to about 1:20, about 1:100 to about 1:25, as well as about 1:100 to about 0:100. In certain embodiments disclosed herein, the rubber composition comprises about 0.01 to about 10 phr silica coupling agent, about 0.01 to about 5 phr, and about 0.01 to about 3 phr.

In certain embodiments, the rubber composition includes (i.e., further comprises) a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in the rubber compositions, according to certain embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in the rubber compositions according to certain embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Other ingredients that may be employed in the rubber compositions of certain embodiments disclosed herein are well known to those of skill in the art and include oils (processing and extender), waxes, processing aids, anti-degradants such as antioxidants and anti-ozonants, tackifying resins, reinforcing resins, fatty acids, peptizers, zinc oxide, and the like. In certain embodiments disclosed herein, the rubber composition comprises at least one of the following: a processing oil; an extender oil; a wax; a processing aid; an anti-degradant such as an antioxidant, an anti-ozonant, or both; a tackifying resin; a reinforcing resin; a fatty acid or a salt thereof; a peptizer; and zinc oxide; in certain such embodiments more than one of each type of ingredient may be utilized (e.g., more than one antioxidant, more than one processing aid, etc.).

Anti-degradants are ingredients added to protect the rubber from oxidative attack. ASTM D-4676 classifies rubber anti-degradants into six classes: p-phenylenediamines (PPDs), trimethyl-dihydroquinolines (TMQs), phenolics, alkylated diphenylamines (DPAs), aromatic phosphites, and diphenylamine-ketone condensates. In certain embodiments disclosed herein, the rubber composition comprises at least one of the foregoing anti-degradants.

As discussed above, in certain embodiments disclosed herein, shea butter may be utilized in combination with at least one additional oil (processing, extender or both). When at least one additional oil is utilized (i.e., in addition to shea butter) it may be a petroleum oil or a plant-sourced oil. In certain embodiments disclosed herein, the rubber composition further comprises at least one petroleum oil, at least one plant-sourced oil (in addition to shea butter), or both. In certain embodiments disclosed herein, the rubber composition is essentially free of any plant byproduct other than shea butter. Essentially free of any plant byproduct other than shea butter can be understood as a rubber composition containing no more than 5 phr of a plant byproduct other than shea butter, including no more than 1 phr of a plant byproduct other than shea butter, and 0 phr of a plant byproduct other than shea butter. Various types of petroleum oils are well known and may be suitable for use as an additional oil (processing, extender, or both) in the rubber compositions of certain embodiments disclosed herein, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil, safflower oil, corn oil, linseed oil, cotton seed oil, rapeseed oil, cashew oil, sesame oil, *camellia* oil, jojoba oil, macadamia nut oil, coconut oil, and palm oil. The foregoing processing oils can also be used as an extender oil, i.e., to prepare an oil-extended polymer or copolymer. Generally, for most tire and tire component applications the total amount of oil used (processing oil and extender oil) in the rubber compositions and methods disclosed herein ranges from about 5 to about 70 phr, about 5 to about 60 phr, about 5 to about 50 phr, the total amount of oil should be understood to include both shea butter and any additional oil. However, in certain tire and tire component applications, the total amount of oil used (processing oil and extender oil) in the rubber compositions and methods disclosed herein is much higher and ranges up to about 175 phr, up to about 150 phr, up to about 100 phr.

The rubber compositions according to the embodiments disclosed herein may generally be formed by mixing together the ingredients for the rubber composition (as disclosed above) by methods known in the art, such as, for example, by kneading the ingredients together in a Banbury mixer or on a milled roll. The methods generally include at least one non-productive master-batch mixing stage and a final productive mixing stage. The term non-productive master-batch stage is known to those of skill in the art and generally understood to be a mixing stage where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the compositions and methods disclosed herein, more than one non-productive master-batch mixing stage may be used. In certain embodiments of the compositions and methods disclosed herein, more than one non-productive master-batch mixing stage is used and shea butter is added in the first (initial) master-batch stage. In other embodiments of the compositions and methods disclosed herein, at least two non-productive master-batch mixing stages are used and shea butter is added in the second master-batch stage. In other embodiments of the compositions and methods disclosed herein, at least two non-productive master-batch mixing stages are used and shea butter is added in more than one master-batch stage. In yet other embodiments of the compositions and methods disclosed herein, more than one non-productive master-batch mixing stage is used and shea butter is added in the last non-productive master-batch mixing stage.

In certain embodiments of the methods for preparing rubber compositions according to the embodiments disclosed herein, the non-productive master batch mixing stage(s) may be conducted at a temperature of about 130° C. to about 200° C. In certain embodiments, the final productive mixing stage may be conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

In certain embodiments disclosed herein, a rubber composition is prepared according to a method that includes at least one non-productive mixing stage and at least one productive mixture stage. In certain embodiments, the method for preparing the rubber compositions of the present disclosure includes: (1) mixing, in at least one non-productive master-batch stage, a rubber composition comprising: 100 phr of at least one rubber; from about 5 to about 200 phr (including 5 to 200 phr) of at least one reinforcing filler; and about 1 to about 50 phr of shea butter; and (2) mixing the resulting product of the non-productive master batch in a final productive stage along with at least one curative, such as a curative package, as discussed above. With respect to certain embodiments disclosed herein, the list of ingredients should be understood as including ingredients to be mixed to form the rubber composition. With respect to other embodiments disclosed herein (i.e., a rubber composition that has been subjected to curing), the list of ingredients should be understood to comprise the ingredients present in the cured rubber composition.

As previously discussed, certain embodiments disclosed herein include tires, tire treads, and tire sidewalls comprising a rubber composition of the second embodiments as otherwise disclosed herein, i.e., comprising at least one rubber and about 1 to about 50 phr of shea butter. More specifically, the present disclosure includes a tire comprising a rubber composition of the embodiments as otherwise disclosed herein, a tire comprising a tire tread comprising a rubber composition of the embodiments as otherwise disclosed herein, a tire tread comprising a rubber composition of the embodiments as otherwise disclosed herein, a tire comprising a tire sidewall comprising a rubber composition of the embodiments as otherwise disclosed herein, and a tire sidewall comprising a rubber composition of the embodiments as otherwise disclosed herein. Generally, when the rubber compositions of the embodiments disclosed herein are utilized in tires, tire treads, or tire sidewalls, these compositions are processed into tire components according to ordinary tire manufacturing techniques including standard rubber shaping, molding, and curing techniques. Any of the various rubber tire components can be fabricated including, but not limited to, treads, sidewalls, belt skims, and carcass. Typically, vulcanization of a tire component is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. In certain embodiments, pneumatic tires containing the rubber compositions as disclosed herein can be produced as discussed in U.S. Pat. Nos. 5,866,171, 5,876,527, 5,931,211, and 5,971,046, which are incorporated herein by reference.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the particular rubbers, fillers, and other ingredients (e.g., antioxidant, curative, etc.) utilized in the examples should not be interpreted as limiting since other such ingredients consistent with the disclosure in the Detailed Description can utilized in substitution. That is, the particular ingredients in the compositions, as well as their respective amounts and relative amounts should be understood to apply to the more general content of the Detailed Description.

Example 1

In Example 1, rubber compositions were prepared including rubber (natural rubber in combination with one of SBR, high-cis polybutadiene, or a combination thereof), silica and carbon black filler and either a petroleum-based processing oil, soy oil or shea butter (in equal amounts). The rubber compositions of Example 1 were prepared in a two-stage mixing process, one master-batch stage and a final batch stage, according to the formulations shown in Table 2A below. The amount of each ingredient used is reported as parts per hundred rubber (phr). The mixing process for these formulations is outlined in Table 2B.

TABLE 2A

| Formulations for Black Oil, Soy Oil and Shea Butter | | | | |
|---|---|---|---|---|
| | | Black Oil | Soy Oil | Shea Butter |
| Master batch | Natural Rubber | 10 | 10 | 10 |
| | Styrene Butadiene Rubber | 50 | 50 | 50 |
| | High cis-Polybutadiene Rubber | 40 | 40 | 40 |
| | Silica Filler | 60 | 60 | 60 |
| | Silica Coupling Agent | 5.3 | 5.3 | 5.3 |

TABLE 2A-continued

Formulations for Black Oil, Soy Oil and Shea Butter

|  |  | Black Oil | Soy Oil | Shea Butter |
|---|---|---|---|---|
| Final | Carbon Black | 15 | 15 | 15 |
|  | Black Oil | 10 | — | — |
|  | Soy Oil | — | 10 | — |
|  | Shea Butter | — | — | 10 |
|  | Antioxidant #1 | 1.5 | 1.5 | 1.5 |
|  | Antioxidant #2 | 1.2 | 1.2 | 1.2 |
|  | Processing Aid | 8 | 8 | 8 |
|  | Stearic Acid | 2 | 2 | 2 |
|  | Zinc Oxide | 2.5 | 2.5 | 2.5 |
|  | Sulfur | 1.9 | 1.9 | 1.9 |
|  | Vulcanization Accelerators | 2.9 | 2.9 | 2.9 |

TABLE 2B

Mixing Parameters for Rubber Compositions of Table 2A

| Stage | Condition |
|---|---|
| Masterbatch | Charge polymers, mix, temp. above 150° C. |
|  | Charge remaining masterbatch ingredients, mix |
|  | Drop ram after 120 seconds |
| Final Batch | Charge masterbatch ingredients, mix |
|  | Charge remaining final batch ingredients, mix |
|  | Drop based on max. temp. of 100° C. |

Each of the rubber compositions was subjected to testing to measure various properties. Results are reported below in Table 3. Samples were tested by tensile testing to measure the elastic properties of the compositions. The abbreviation $E_b$ is used for elongation at break and $T_b$ for stress at break. The abbreviation M300 is used for the tensile stress measured at 300% elongation.

TABLE 3

Analysis of Shea Butter Compared to Black Oil and Soy Oil

|  |  | Black Oil | Soy Oil | Shea Butter | Shea Butter v. Black Oil | Shea Butter v. Soy Oil |
|---|---|---|---|---|---|---|
| Stress/Strain | M300 | 7.1 | 7.1 | 6.8 | −4.2% | −4.2% |
|  | Tensile | 17.6 | 17.7 | 17.2 | −2.3% | −2.8% |
|  | Elongation | 622 | 608 | 605 | −2.7% | −0.5% |
|  | 100° C. $T_b \times E_b$ | 3993 | 4585 | 4344 | 8.8% | −5.3% |
| Viscoelastic E' Index | −25° C. | 100 | 112 | 113 | 13.0% | 0.9% |
|  | −20° C. | 100 | 112 | 116 | 16.0% | 3.6% |
|  | −10° C. | 100 | 115 | 121 | 21.0% | 6.1% |
|  | 0° C. | 100 | 111 | 120 | 20.0% | 8.1% |
|  | 30° C. | 100 | 112 | 111 | 11.0% | −0.9% |
|  | 60° C. | 100 | 112 | 110 | 10.0% | −1.8% |
| Viscoelastic Tan δ | 0° C. | 100 | 101 | 95 | −5.0% | −5.9% |
|  | 30° C. | 100 | 101 | 97 | −3.0% | −4.0% |
|  | 60° C. | 100 | 102 | 100 | 0.0% | −2.0% |
| Processing | T50 | 5.3 | 5.3 | 5.1 | −3.8% | −3.8% |
|  | T90 | 10.0 | 10.0 | 9.8 | −2.0% | −2.0% |
|  | RPA G' | 56.5 | 56.5 | 56.5 | 0.0% | 0.0% |
|  | RPA Scorch | 22.0 | 21.1 | 20.0 | −9.1% | −5.2% |
| Lambourn Wear | Composite Wear Rate (mg/m) | 0.0703 | 0.0651 | 0.0608 | −13.5% | −6.6% |
|  | Wear Index | 100 | 108 | 115 | 13.5% | 6.6% |

Tensile mechanical properties of the samples were determined following the guidelines, but not restricted to, the standard procedure described in ASTM D-412, using dumbbell-shaped samples with a cross-section dimension of 4 mm in width and 1.9 mm in thickness at the center. Specimens were strained at a constant rate and the resulting force was recorded as a function of extension (strain). The specimens were tested at either 25° C. or 100° C. Samples were cured for 40 minutes at 150° C., and then tensile properties were analyzed at 25° C. and at 100° C. The Die B Tear was measured using the same dumbbell-shaped samples as described above, and was determined following the guidelines of, but not restricted to, the standard procedure described in ASTM D-624; the test was conducted on cured samples.

Tan δ values were measured using a dynamic compression test done with an Eplexor® mechanical spectrometer (Gabo Qualimeter Testanlagen GmbH; Germany). The measurements were made by applying a compression dynamic strain of 0.2% from 50° C. to −5° C. and then at a dynamic strain of 0.1% from −5° C. to 65° C. A rubber composition's tan δ at 0° C. is indicative of its wet traction when incorporated into a tire tread, its tan δ at 30° C. is indicative of its dry traction when incorporated into a tire tread, and its tan δ at 60° C. is indicative of its rolling resistance when incorporated into a tire tread.

The wear resistance of the test samples was evaluated using the Lambourn Abrasion test. Test specimens were rubber wheels rotated on an axle and run at various slip angles and speeds against a driven abrasive surface, e.g., sand paper. Talc powder is used as a lubricant. The test specimen is weighed before testing an after testing to determine the amount of material loss and a wear index is calculated using the average rate of material loss (typically using 3-5 data points). Thus, a wear resistance index greater than 100 indicates that the experimental compound is better (abrades at a lower rate) than the control compound having a standardized index of 100.

As discussed above, the embodiments disclosed herein are directed to a method for improving the wear resistance of a rubber composition. The method includes incorporating about 1 to about 50 phr of shea butter (e.g., 10 phr as shown in Table 2A) into at least one rubber to form a rubber composition. In various embodiments, the method should be understood to include forming rubber compositions having the various ingredients and compositions discussed above. In the disclosed embodiments, the improvement in the wear resistance of the rubber composition is measured by an improvement in the Lambourn wear index and from Table 3, the wear resistance of the rubber composition is improved by about 13.5% (including at least 13.5%) as compared to a rubber composition having the same ingredients other than replacing shea butter with black oil. Also in the disclosed embodiments, and from Table 3, the wear resistance of the rubber composition is improved by about 6.6% (including at least 6.6%) as compared to a rubber composition having the same ingredients other than replacing shea butter with soy oil.

As can be seen from the data in Table 3, the addition of shea butter to rubber compositions in place of both black oil and soy oil improved wear index of the rubber composition, with a 13.5% improvement compared to rubber compositions containing black oil, and a 6.6% improvement compared to rubber compositions containing soy oil. The shea butter-containing composition showed an improvement in tear resistance, i.e. $T_b \times E_b$, of at least 8.8%, whereas there was a decrease of 5.3% in tear resistance when compared to rubber compositions containing soy oil rather than shea butter. Thus, the use of shea butter in the rubber compositions increases the tear resistance by at least or about 5%, 6%, 7%, 8% or 9% as compared to rubber compositions having the same ingredients other than replacing the shea butter with a petroleum-derived oil (e.g., black oil).

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A rubber composition for a tire comprising at least one rubber component and about 1 to about 50 phr of shea butter, the rubber composition having a Lambourn wear index of more than 105 as compared to an un-modified rubber composition having the same composition as the rubber composition but having an equivalent amount of petroleum-derived oil in place of the shea butter and having a relative standard Lambourn index value of 100.

2. The rubber composition of claim 1, shea butter being present in the rubber composition at about 5 to about 30 phr.

3. The rubber composition of claim 1, the rubber component comprising at least one conjugated diene monomer-containing polymer or copolymer.

4. The rubber composition of claim 1, the shea butter having a fatty acid profile comprising at least 30 weight percent of stearic acid based on the weight of the fatty acid present in the shea butter.

5. The rubber composition of claim 1, the rubber composition having a Lambourn wear index of more than 110.

6. A component of a tire comprising the rubber composition of claim 1.

7. The rubber component of a tire of claim 6 being selected from the group consisting of a tread member, an inner lining, sidewalls, body plies, and/or a belt package.

8. The component of a tire of claim 7, wherein the tread member comprises the rubber composition in an amount of at least 50 weight percent based on the weight of the tread member.

9. A method for improving the wear resistance of a component of a tire, the method comprising the step of incorporating about 1 to about 50 phr of shea butter with a rubber to form a rubber composition, wherein component of a tire comprises the rubber composition and the rubber composition has a Lambourn wear index of more than 105 as compared to an un-modified rubber composition having the same composition as the rubber composition but having an equivalent amount of petroleum-derived oil in place of the shea butter and having a relative standard Lambourn index value of 100.

10. The method of claim 9, shea butter being present in the rubber composition at about 5 to about 30 phr, and the rubber composition further comprises a cure package or about 5 to about 200 phr of a reinforcing filler.

11. The method of claim 9, the rubber composition comprising at least one conjugated diene monomer-containing polymer or copolymer.

12. The method of claim 9, the shea butter having a fatty acid profile comprising at least 30 weight percent of stearic acid based on the weight of the fatty acid present in the shea butter.

13. The method of claim 9, the rubber composition having a Lambourn wear index of more than 110.

* * * * *